Oct. 16, 1934.  I. P. SCHMID  1,977,356
COMBINED AUTOMOBILE WARNING SIGNAL AND TROUBLE LAMP
Filed April 21, 1930
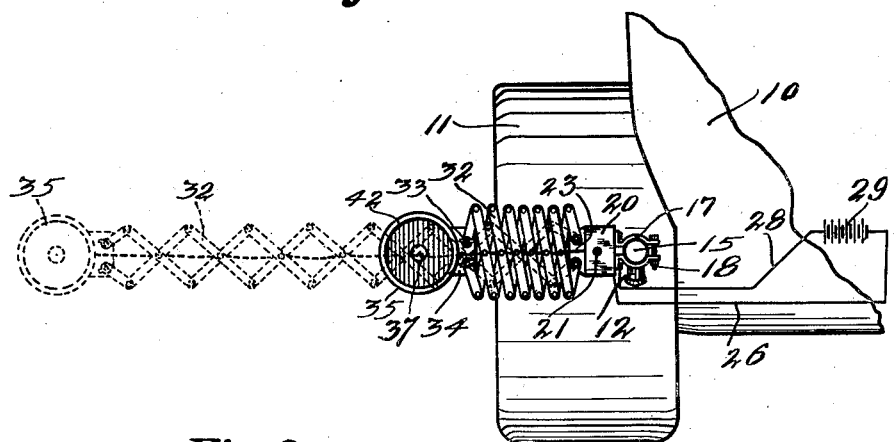
Inventor
Ivan P. Schmid
By Arthur H. Sturges
Attorney Patented Oct. 16, 1934

1,977,356

UNITED STATES PATENT OFFICE 1,977,356

COMBINED AUTOMOBILE WARNING SIGNAL AND TROUBLE LAMP

Ivan P. Schmid, Leigh, Nebr., assignor of one-half to Wilhelm Schelstede, Leigh, Nebr.

Application April 21, 1930, Serial No. 446,076

1 Claim. (Cl. 177—327)

This invention relates to a combined warning signal and trouble lamp for vehicles, and more particularly for automobiles or trucks, and has for its principal object to provide a device for this purpose which will be convenient in use and may be economically manufactured.

Another object of the invention is to provide a device whereby the drivers of vehicles approaching a vehicle upon the road from either direction will be warned of the presence of the vehicle in due season.

A further object of the invention is to provide a signalling device for vehicles in which drivers of on-coming vehicles to both the front and rear may be apprised of the presence of a stationary vehicle upon the road, the latter being provided with warning lights or without the warning lights.

A still further object of the invention resides in providing an improved signalling apparatus for vehicles in which selective means is arranged convenient to the driver of the vehicle, whereby he may operate the signal from the automobile to show a visible illuminated light or he may depend upon the signal itself to reflect the light from the headlight of an on-coming vehicle and in which further means is provided associated with the aforesaid means, whereby the said signal may be utilized as a trouble lamp for work about the vehicle.

A still further object of the invention is to provide an improved signal mechanism having a novel construction of housing or casing for the signal lights, whereby such casing may be readily taken apart to replace burned out light bulbs, etc.

The invention still further aims to provide a signal and trouble lamp of this character which has a bracket which may be extended to a considerable distance beyond the side of the vehicle to which it is attached, and which has a detachable lamp housing on its outer end and a cord and reel admitting of the adjustment of the bracket and of the detachment and location of the lamp housing in different positions within the limits of the electric cord, the latter being maintained taut in all adjustments of the lamp housing and the bracket.

Other and further objects and advantages of the invention will be understood from the following detailed description, reference being had to the accompanying drawing, wherein:

Figure 1 is a rear elevation of a combined warning signal and trouble lamp constructed in accordance with the present invention and as applied to the rear end of a motor vehicle, the dotted lines showing the device in extended position and the battery and wire connections being shown diagrammatically.

Figure 2 is a horizontal central section, enlarged, through the bracket casing showing the mounting of the electric cord and the support for the extensible arm.

Figure 3 is a fragmentary vertical section, further enlarged, of the bracket casing and adjacent parts.

Figure 4 is a detail side elevation of a supporting arm adapted to be mounted on the fender of the vehicle, and Figure 5 is an enlarged top plan view, partly in section, of the outer end of the device showing the lamp housing connected to the bracket.

Referring to the drawing, 10 designates a motor vehicle which is shown fragmentarily in Figure 1 and which is provided with the usual rear fender 11.

The present invention comprises an arm 12 provided with a shouldered threaded stud 13 at its inner end adapted to engage through the fender 11 and which is held rigidly thereto by a nut 14 or the like. The arm 12 is suitably curved so as to dispose its outer attaching portion 15 in substantially a horizontal position. The said portion 15 is provided with spaced flanges or collars 16 adapted to receive therebetween clamping arms 17 as shown in Figure 1.

These clamping arms 17 are bowed outwardly from each other intermediate their ends to form a substantially cylindrical socket for the reception of the outer end 15 of the supporting arm 12, and the clamping arms 17 are provided with a clamping bolt 18 adapted to be tightened for drawing the arms 17 together and binding the clamp upon the arm 12.

The clamping arms 17 are secured by bolts 19 or the like to the inner edge of a bracket casing 20 which may be of any suitable configuration but which in the present case is shown as being relatively shallow and extending upwardly in a general vertical plane.

Rotatably mounted in the bracket housing 20 upon a pin 21 is a spool 22 about which is wound the inner end of an electric wire 23, the latter being carried forwardly through an opening 24 in the front edge of the casing 20. The spool 22 carries a spring 25 of spiral form having one end secured to the pin 21 which is fixed in the casing 20 and having its other end secured to the spool for yieldingly holding the spool in a predetermined position of rest.

The bracket casing 20 is grounded in any suitable manner, such as through a wire 26 while the pin 21, which is in electric communication with the wire 23 through the spring 25, is connected by a spring contact 27 with a wire 28. As shown in Figure 1, the wires 26 and 28 lead from the opposite sides of a battery 29, and any suitable switches or other devices may be interposed in the wiring.

The outer end of the bracket casing 20 carries a lug 30 to which are pivotally connected at 31 the inner links of a lazy tongs 32 lying in the general plane of the bracket casing 20 and adapted to be extended laterally from the vehicle 10 as shown in dotted lines in Figure 1. The lazy tongs 32 comprises a form of extensible bracket arm, and at its outer end is detachably pivoted by bolts 33 to a lug 34 carried upon the inner side of a lamp housing 35.

The lamp housing 35 is normally disposed with its longitudinal axis horizontal and parallel to the axis of the vehicle 10. In the rear end of the lamp housing 35 is fitted a parabolic reflector 36 of a red color and at the focus of which is disposed an electric lamp 37. A cover glass 38, comprising a lens or the like is fitted over the rear end of the lamp housing 35 to enclose the lamp 37 and protect the reflector 36.

The forward end of the lamp housing 35 is also provided with a parabolic reflector 39 which is preferably of a green color and in the focus of which is mounted an electric lamp 40 protected by a cover glass 41 comprising a lens or the like. The cover glasses 38 and 41 may be detachably mounted upon the opposite ends of the housing 35 by removable flanged rings 42 or the like.

The outer end of the electric wire 23 is carried through the inner side of the lamp housing 35, is branched as at 43 and connected to the lamps 37 and 40.

In use, the device is mounted upon the rear end of the motor vehicle in any suitable manner, such as shown in Figure 1, by securing the clamping arms 17 on the outer end 15 of the supporting arm 12 which projects rearwardly and substantially from the fender 11. Of course the arm 12 may be mounted on the vehicle in any suitable manner and the device is adapted for use not only on passenger vehicles, but on trucks of various types, and may be mounted and used wherever it is desired to have a lamp for giving warning or for use where light is desired temporarily.

When the circuit is closed the lamps 37 and 40 are lighted and the reflector 36 projects a red light rearwardly from the lamp housing while the reflector 37 projects a green light forwardly through the lamp housing with the result that a green caution signal is given at the front of the vehicle 10 while a red danger signal is given at the rear of the vehicle.

The extensible bracket arm 32 may be drawn out to the desired extent, as shown in Figure 1, so as to dispose the lamp housing 35 a considerable distance laterally of the vehicle. Thus with the device of the invention, the lamp may be used as an ordinary tail light, and without requiring any removal or introduction of parts the lamp may be extended to various distances beyond the side of the vehicle so that the lamp may be visible from both the front and the rear of the vehicle and thus produce a danger signal adapted to protect the operator of the vehicle when standing or working at the side thereof and also to warn approaching motorists that the vehicle carrying it is at rest. In other words, the invention provides a device which, when the operator alights from the vehicle may be merely grasped and drawn out quickly to the desired extent. The lamp will shed light along the side of the vehicle to assist the driver in changing a tire or the like and at the same time will give the desired warning signal by colored light to approaching vehicles and will show clearly the nature of the obstruction. When the arm 32 is extended the electric wire 23 is drawn outwardly with the lamp housing 35 and is unwound from the spool 22, the spring 25 being wound up proportionately. When the bracket arm is contracted the wire 23 is maintained taut by the action of the spring 25 in rewinding the wire 23 on the spool 22.

It is apparent that should the electric current fail the red and green reflectors 36 and 39 will reflect back the corresponding red and green light rays from the lights of any vehicle approaching from the front or the rear of the vehicle 10 and accordingly the desired warning will be given.

When it is desired to use the device as a trouble lamp it is only necessary to remove the bolts 33 and detach the lamp housing from the outer end of the bracket arm 32 and to then manipulate the lamp housing for throwing the light from either end thereof on the object or in the area desired to be illuminated.

It is obvious that various changes and modifications may be made in the details of construction and design of the above specifically described embodiment of this invention without departing from the spirit thereof, such changes and modifications being restricted only by the scope of the following claim.

What is claimed is:—

A signal for indicating that a person is working alongside of a vehicle parked along a road, comprising a lamp casing, a warning lens in the side of said casing towards the rear of the vehicle and indicating an obstruction that should be passed around, a lens in the opposite side of said casing for throwing light forwardly, means for supporting said casing in retracted position near the body of said vehicle in rear of the back wheel and relatively near the ground, said supporting means including means whereby the casing may be supported outside of the edge of the vehicle a distance sufficient to enable a person to work alongside of the vehicle and the light from the forward lens illuminates the space that would be occupied by said person.

IVAN P. SCHMID.